US012688443B2

(12) United States Patent
Yan

(10) Patent No.: US 12,688,443 B2
(45) Date of Patent: Jul. 21, 2026

(54) INFORMATION PROCESSING METHOD AND APPARATUS, AND COMPUTER-READABLE STORAGE MEDIUM

(71) Applicant: Tencent Technology (Shenzhen) Company Limited, Shenzhen (CN)

(72) Inventor: Chao Yan, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 1083 days.

(21) Appl. No.: 17/727,168

(22) Filed: Apr. 22, 2022

(65) Prior Publication Data

US 2022/0245495 A1 Aug. 4, 2022

Related U.S. Application Data

(63) Continuation of application No. PCT/CN2021/086778, filed on Apr. 13, 2021.

(30) Foreign Application Priority Data

May 19, 2020 (CN) .......................... 202010427162.9

(51) Int. Cl.
*G06N 7/01* (2023.01)
(52) U.S. Cl.
CPC ...................................... *G06N 7/01* (2023.01)
(58) Field of Classification Search
CPC ...................................................... G06N 7/01
See application file for complete search history.

(56) References Cited

U.S. PATENT DOCUMENTS 8,984,147 B1 * 3/2015 Kret ................. G08G 1/096833
705/14.63
9,501,549 B1 * 11/2016 Wang .................... G06F 16/951
(Continued)

FOREIGN PATENT DOCUMENTS

CN 105913286 A 8/2016
CN 106294457 A 1/2017
(Continued)

OTHER PUBLICATIONS

International Search Report and Written Opinion for PCT/CN2021/086778 mailed Jul. 9, 2021 including translation of Search Report (12 pages).

(Continued)

*Primary Examiner* — Jeremy L Stanley
(74) *Attorney, Agent, or Firm* — Crowell & Moring LLP

(57) ABSTRACT

In the embodiments of this application, feedback data of historical push information is counted, the feedback data including exposure data and click data. A first probability distribution corresponding to a click-through rate of each piece of push information in the historical push information is generated based on the exposure data and the click data. First predicted click-through rates of to-be-pushed push information are determined according to the first probability distribution, and a preset quantity of pieces of first push information are selected from the to-be-pushed push information according to the first predicted click-through rates. A target predicted click-through rate of each piece of first push information in the first push information is obtained by using a preset target click-through rate prediction model, and target push information is selected for pushing from the first push information according to the target predicted click-through rate.

18 Claims, 6 Drawing Sheets

(56) References Cited

U.S. PATENT DOCUMENTS

| | | | | |
|---|---|---|---|---|
| 10,657,556 | B1 * | 5/2020 | Lu ........................ | G06N 20/00 |
| 2006/0095336 | A1 * | 5/2006 | Heckerman ........... | G06Q 40/04 705/26.3 |
| 2007/0038508 | A1 * | 2/2007 | Jain .................... | G06Q 30/0242 705/14.71 |
| 2007/0256095 | A1 * | 11/2007 | Collins ................ | G06Q 30/02 725/35 |
| 2008/0270364 | A1 * | 10/2008 | Bayardo ............... | G06Q 30/02 |
| 2008/0275775 | A1 * | 11/2008 | Gonen ................. | G06Q 30/02 703/2 |
| 2009/0063377 | A1 * | 3/2009 | Brady ................ | G06Q 30/0244 706/46 |
| 2009/0327030 | A1 * | 12/2009 | Collins ................ | G06Q 30/02 705/14.43 |
| 2010/0121624 | A1 * | 5/2010 | Roy .................... | G06F 16/958 703/6 |
| 2010/0121801 | A1 * | 5/2010 | Roy .................... | G06Q 30/02 706/46 |
| 2011/0196733 | A1 * | 8/2011 | Li ...................... | G06Q 30/02 705/14.42 |
| 2014/0337096 | A1 * | 11/2014 | Bilenko ............... | G06N 20/00 705/7.31 |
| 2015/0356658 | A1 * | 12/2015 | Morris ............... | G06Q 30/0631 705/26.7 |
| 2016/0350802 | A1 * | 12/2016 | Mehanian .......... | G06Q 30/0254 |
| 2017/0061481 | A1 * | 3/2017 | Wee ................... | G06Q 30/0201 |
| 2017/0098240 | A1 | 4/2017 | Yang et al. | |
| 2017/0193561 | A1 * | 7/2017 | Shen ................. | G06Q 30/0275 |
| 2019/0087867 | A1 * | 3/2019 | Yavonditte ......... | G06Q 30/0242 |
| 2019/0311395 | A1 * | 10/2019 | Lin .................... | G06Q 30/0254 |
| 2020/0142944 | A1 | 5/2020 | Zhang et al. | |
| 2020/0380583 | A1 * | 12/2020 | Lee ................... | G06Q 30/0631 |
| 2021/0004379 | A1 * | 1/2021 | Lee ................... | G06Q 30/0282 |

FOREIGN PATENT DOCUMENTS

| | | |
|---|---|---|
| CN | 110008399 A | 7/2019 |
| CN | 110019290 A | 7/2019 |
| CN | 110347781 A | 10/2019 |
| CN | 110378434 A | 10/2019 |
| CN | 111160959 A | 5/2020 |

OTHER PUBLICATIONS

Chinese-language Office Action issued in Chinese Application No. 202010427162.9 dated Feb. 26, 2025 with English translation (23 pages).

Zhang Wei, "The chain structure of precision advertising" Northeastern Forestry University Press, Oct. 31, 2018, including English translation (4 pages).

Fuyong et al. "Improved Bayesian Probalistic Model Recommender System" Computer Science, vol. 44, No. 5, May 2017, w/English Abstract (5 pages).

Office Action issued in Japanese Patent Application No. 202010427162.9 dated May 21, 2025, w/English translation, 22 pages.

Lasheng et al., "Uncertainty Decision Making and Investment in Financial Assets" Aug. 2002, 3 pages.

* cited by examiner

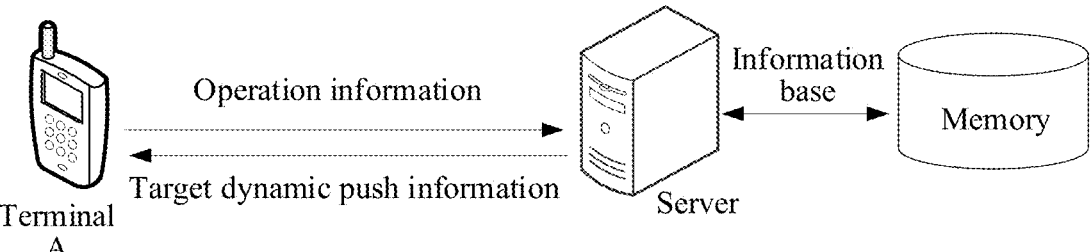

FIG. 1

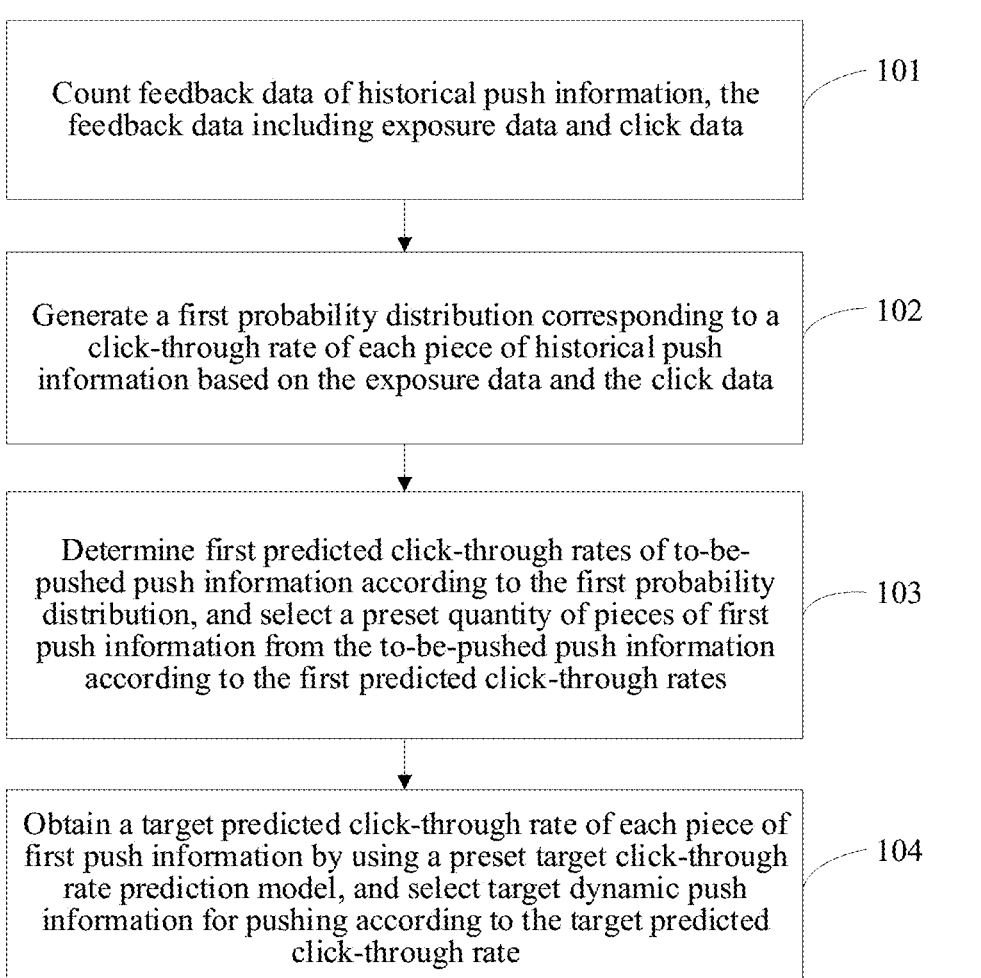

Count feedback data of historical push information, the feedback data including exposure data and click data — 101

Generate a first probability distribution corresponding to a click-through rate of each piece of historical push information based on the exposure data and the click data — 102

Determine first predicted click-through rates of to-be-pushed push information according to the first probability distribution, and select a preset quantity of pieces of first push information from the to-be-pushed push information according to the first predicted click-through rates — 103

Obtain a target predicted click-through rate of each piece of first push information by using a preset target click-through rate prediction model, and select target dynamic push information for pushing according to the target predicted click-through rate — 104

FIG. 2A

| | Advertisement creativity | Belonged advertisement | Creativity form | Exposure amount | Click amount | Click-through rate | Average price of click | Cost |
|---|---|---|---|---|---|---|---|---|
| ☐ | ∞ ☺ cityXXXX | 13-01 | Template large image 16:9 | 13241 | 41 | 0.31% | 0.12 | 5.03 |
| ☐ | ∞ ⛰ 2000XXX | 13-01 | Template large image 16:9 | 3716 | 3 | 0.08% | 0.14 | 0.43 |
| ☐ | ∞ 🌷 2100XXX | 13-01 | Template large image 16:9 | 7136 | 16 | 0.22% | 0.15 | 2.34 |

INFORMATION PROCESSING METHOD AND APPARATUS, AND COMPUTER-READABLE STORAGE MEDIUM

RELATED APPLICATION

This application is a continuation of International Patent Application No. PCT/CN2021/086778, filed Apr. 13, 2021, which claims priority to Chinese Patent Application No. 202010427162.9, entitled "INFORMATION PROCESSING METHOD AND APPARATUS, AND COMPUTER-READABLE STORAGE MEDIUM" filed with the China National Intellectual Property Administration on May 19, 2020. The contents of International Patent Application No. PCT/CN2021/086778 and Chinese Patent Application No. 202010427162.9 are incorporated herein by reference in their entirety.

FIELD OF THE TECHNOLOGY

This application relates to the field of information processing technologies, and specifically, to an information processing method and apparatus, and a computer-readable storage medium.

BACKGROUND OF THE DISCLOSURE

With the development of networks and wide application of computers, an online information pushing market expands rapidly. A pushing person paying for releasing push information can pay to a publisher (a pushing platform), to release his/her own push information by using a website, a search engine, a browser, or other online media, to well prompt his/her own products.

In the related art, to better implement creativity selection, the pushing person can establish a plurality of pieces of dynamic push information under one piece of push information to form different creativities, and randomly push the plurality of pieces of dynamic push information online at the same time, to select dynamic push information with best performance according to performance of the plurality of pieces of dynamic push information on a client, to implement creativity selection.

SUMMARY

Embodiments of this application provide an information processing method and apparatus, and a non-transitory computer-readable storage medium, which can improve the accuracy of information processing.

An embodiment of this application provides an information processing method, including:

counting feedback data of historical push information, the feedback data including at least exposure data and click data;

generating a first probability distribution corresponding to a click-through rate of each piece of push information in the historical push information based on the exposure data and the click data;

determining first predicted click-through rates of to-be-pushed push information according to the first probability distribution, and selecting a preset quantity of pieces of first push information from the to-be-pushed push information according to the first predicted click-through rates; and obtaining a target predicted click-through rate of each piece of first push information, and selecting target dynamic push information for pushing from the first push information according to the target predicted click-through rate.

An information processing apparatus is provided, including:

a counting unit, configured to count feedback data of historical push information, the feedback data including at least exposure data and click data;

a generation unit, configured to generate a first probability distribution corresponding to a click-through rate of each piece of push information in the historical push information based on the exposure data and the click data;

a first pre-ranking unit, configured to determine first predicted click-through rates of to-be-pushed push information according to the first probability distribution, and select a preset quantity of pieces of first push information from the to-be-pushed push information according to the first predicted click-through rates; and a ranking unit, configured to obtain a target predicted click-through rate of each piece of first push information, and select target dynamic push information for pushing from the first push information according to the target predicted click-through rate.

A non-transitory computer-readable storage medium is provided, the computer-readable storage medium storing a plurality of instructions, the instructions being suitable for being loaded by a processor, to perform the operations in the foregoing information processing method.

In the embodiments of this application, feedback data of historical push information is counted; a first probability distribution corresponding to a click-through rate of each piece of historical push information is generated based on exposure data and click data in the feedback data; a preset quantity of pieces of first push information are selected according to the first probability distribution; and a target predicted click-through rate of each piece of first push information is obtained, and target dynamic push information is selected for pushing from the first push information according to the target predicted click-through rate, thereby greatly improving the accuracy of information processing.

BRIEF DESCRIPTION OF THE DRAWINGS

To describe technical solutions in embodiments of this application more clearly, the following briefly introduces the accompanying drawings required for describing the embodiments. Apparently, the accompanying drawings in the following description show only some embodiments of this application, and a person skilled in the art may still derive other accompanying drawings from these accompanying drawings without creative efforts.

FIG. 1 is a schematic scenario diagram of an information processing system according to an embodiment of this application.

FIG. 2a is a schematic flowchart of an information processing method according to an embodiment of this application.

DESCRIPTION OF EMBODIMENTS

Figure 2B:
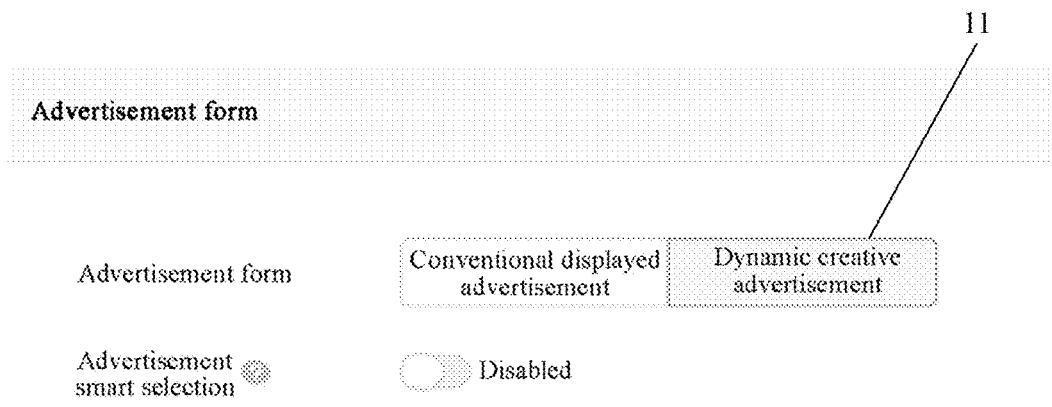
FIG. 2b is a schematic diagram of a product of an information processing method according to an embodiment of this application.

The technical solutions in embodiments of this application are clearly and completely described in the following with reference to the accompanying drawings in the embodiments of this application. Apparently, the described embodiments are merely some rather than all of the embodiments of this application. All other embodiments obtained by a person skilled in the art based on the embodiments of this application without creative efforts shall fall within the protection scope of this application.

Embodiments of this application provide an information processing method and apparatus, and a non-transitory computer-readable storage medium.

Referring to FIG. 1, FIG. 1 is a schematic scenario diagram of an information processing system according to an embodiment of this application, which includes a terminal A and a server (the information processing system may further include other terminals except the terminal A, and a specific quantity of terminals is not limited herein). The terminal A and the server may be connected by using a communication network, and the communication network may include a wireless network and a wired network, where the wireless network includes one of or a combination of a wireless wide area network, a wireless local area network, a wireless metropolitan area network, or a wireless personal area network. The network includes network entities such as a router and a gateway, which are not shown in the figure. The terminal A can perform information exchange with the server by using the communication network. For example, when the terminal A runs an application such as a video, short video, Weibo, or shopping application including various types of push information, the terminal A can detect operation information (namely, feedback data) of a user on the push information, where the operation information includes at least exposure data and click data, and can transmit the operation information to the server.

During the research and practice of the related art, the inventor of this application found that, in the related art, an exposure chance may be wasted on poor dynamic push information due to a randomly pushing manner, affecting a result of creativity selection and leading to relatively low accuracy of information processing.

The information processing system of the embodiments of this application may include an information processing apparatus, and the information processing apparatus can be specifically integrated in the server. In FIG. 1, the server may receive the operation information uploaded by the terminal A and count operation information of historical push information, the operation information including at least exposure data and click data; generate a first probability distribution corresponding to a click-through rate of each piece of historical push information based on the exposure data and the click data; determine first predicted click-through rates of to-be-pushed push information according to the first probability distribution; select a preset quantity of pieces of first push information from the to-be-pushed push information according to the first predicted click-through rates; obtain a target predicted click-through rate of each piece of first push information, and select target push information for pushing according to the target predicted click-through rate. The target push information is more consistent with the preference of the user, and a better creativity selection effect may be achieved. Solutions of the embodiments are also suitable for dynamic push information, and a description is made in some subsequent embodiments by using dynamic push information as an example.

The information processing system may further include the terminal A, and the terminal A may be installed with various applications required by the user such as a video, short video, Weibo, or shopping application. For example, when the terminal A runs the video application, the terminal A can display push information, detect operation information of the user on the push information, where the operation information includes at least exposure data and click data, and transmit the operation information to the server.

The schematic scenario diagram of the information processing system shown in FIG. 1 is merely an example. The information processing system and the scenario described in the embodiments of this application are intended to describe the technical solutions in the embodiments of this application more clearly, and do not constitute a limitation on the technical solutions provided in the embodiments of this application. A person of ordinary skill in the art may learn that, with evolution of the information processing system and appearance of a new service scenario, the technical solutions provided in the embodiments of this application also apply to a similar technical problem.

Detailed descriptions are separately provided below. Sequence numbers of the following embodiments are not intended to limit preference orders of the embodiments.

Embodiment 1

In this embodiment, a description is made in terms of an information processing apparatus. The information processing apparatus may be specifically integrated in a server having a storage unit and a calculation capability and installed with a microprocessor. The server may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform.

Referring to FIG. 2*a*, FIG. 2*a* is a schematic flowchart of an information processing method according to an embodiment of this application. The information processing method includes:

Step 101: Counting operation information of each piece of dynamic push information.

Push information is related introduction information that a pushing person pay to a pushing platform to prompt his/her own products through a website, a search engine, a browser, or online media, and the push information may be an advertisement. The dynamic push information may be a dynamic creative (DC) advertisement. The dynamic push information is a creative presentation form of the push information and can display different advertisement creativities to the user, and the user can establish different dynamic push information for one piece of push information. To better describe the dynamic push information in the embodiments of this application, reference may be made to the following description.

Referring to FIG. 2*b* together, FIG. 2*b* is a schematic diagram of a product of an information processing method according to an embodiment of this application. The user can establish dynamic push information of push information by clicking a DC advertisement control 11 on a client, and settings such as placement, scheduling, and bidding of the dynamic push information are the same as those of a common advertisement.

Figure 2C:
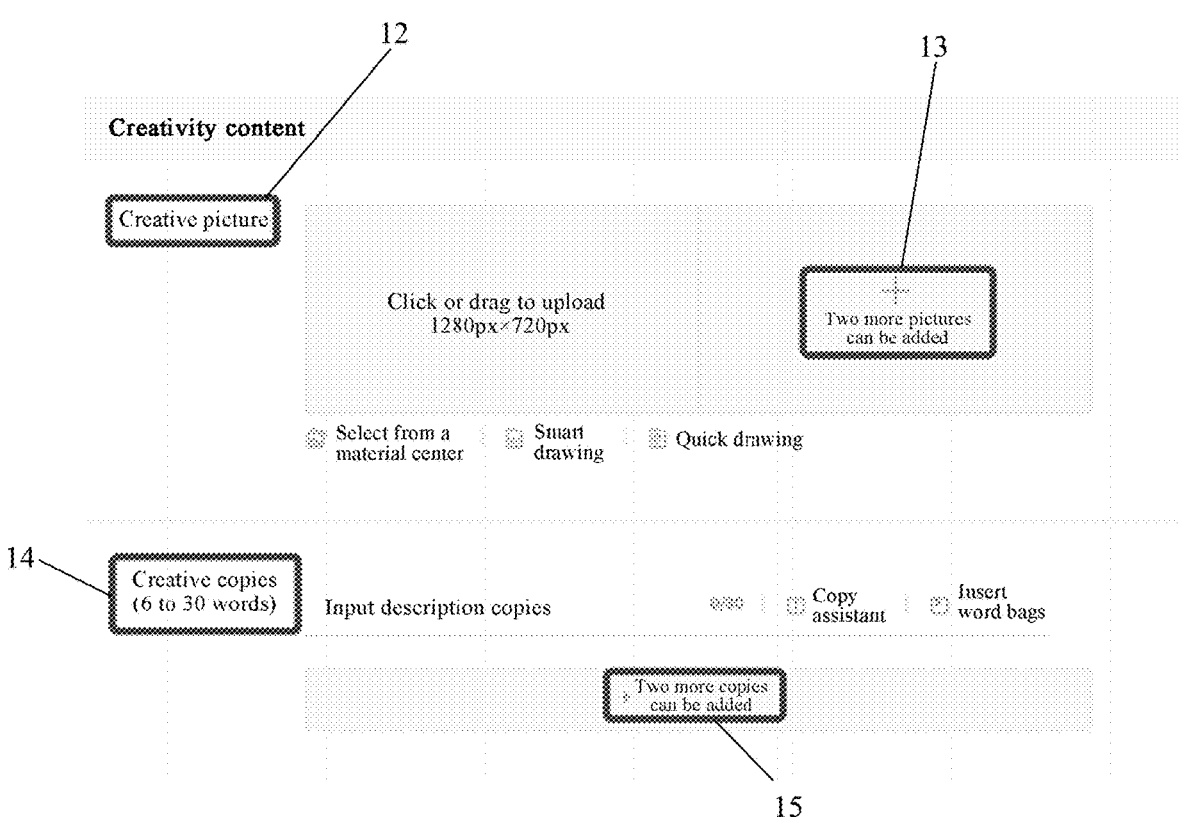
FIG. 2c is a schematic diagram of another product of an information processing method according to an embodiment of this application.

Referring to FIG. 2*c*, FIG. 2*c* is a schematic diagram of another product of an information processing method according to an embodiment of this application. The user can add a plurality of pictures by using a picture addition control 13 of a creative picture region 12 and add a plurality of creative copies by using a copy addition control 15 of a creative copy region 14, and the user can also add a plurality of titles.

Figures 2D, 2E:
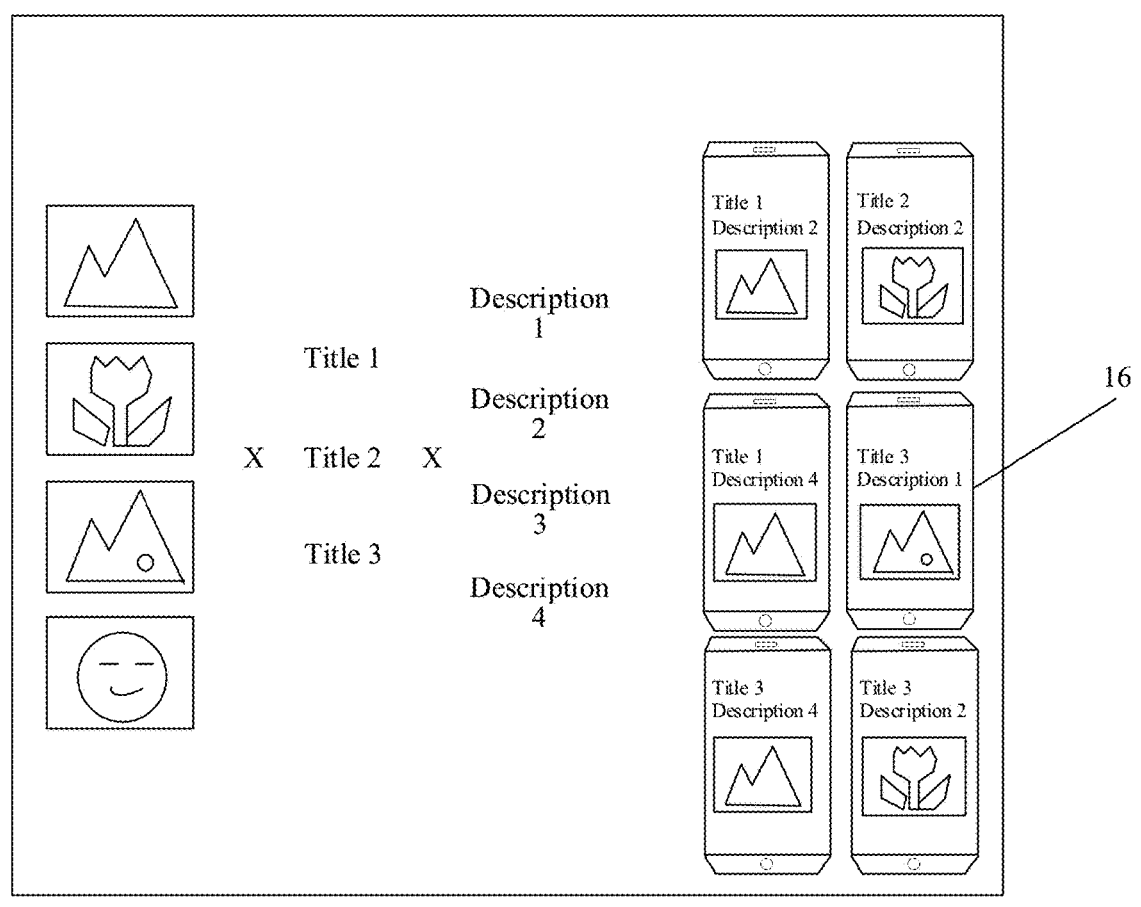
FIG. 2*d* is a schematic diagram of another product of an information processing method according to an embodiment of this application.
FIG. 2*e* is a schematic diagram of another product of an information processing method according to an embodiment of this application.

Referring to FIG. 2*d*, FIG. 2*d* is a schematic diagram of another product of an information processing method according to an embodiment of this application. The client can combine the plurality of pictures, the plurality of copies, and the plurality of titles, to form a creativity of a plurality of pieces of dynamic push information of the push information. As shown in FIG. 2*d*, 4 pictures, 3 titles, and 4 creative copies (namely, description) can form 4\*3\*4=48 pieces of dynamic push information, and one piece of dynamic push information (namely, creativity) may be selected from the dynamic push information to the user in subsequent push of the push information. To achieve maximum resource utilization of an advertiser, dynamic push information with the best creativity needs to be selected from the plurality of pieces of dynamic push information for display. For example, referring to FIG. 2*e*, FIG. 2*e* is a schematic diagram of another product of an information processing method according to an embodiment of this application. After the dynamic push information is released, feedback data (namely, the operation information) of each creativity may be monitored by using a client page shown in FIG. 2*e*, and dimensions may include various aspects of dynamic push information that the pushing person intends to know, such as exposure data, click data, conversion data, a click-through rate, virtual cost data (namely, costs) of each creativity, thereby implementing intuitive understanding on the preference of the entire creativity and helping the pushing person select excellent dynamic push information.

A cloud technology is a collective name of a network technology, an information technology, an integration technology, a management platform technology, an application technology, and the like based on an application of a cloud computing business mode, and may form a resource pool. Usage is based on a requirement and is flexible and convenient. A cloud computing technology becomes an important support. A backend service of a technical network system requires a large amount of computing and storage resources, such as a video website, an image website, and more portal websites. As the Internet industry is highly developed and applied, each article may have its own identifier in the future and needs to be transmitted to a backend system for logical processing. Data at different levels is separately processed, and data in various industries requires strong system support and this can only be implemented through cloud computing.

In this application, operation information of each piece of dynamic push information in the same push information can be counted in real time by using the cloud technology. The operation information may include at least exposure data and click data. The exposure data is a quantity generated in event that each piece of dynamic push information is exposed (displayed), where larger exposure data indicates a larger quantity of times that the dynamic push information is displayed, and smaller exposure data indicates a smaller quantity of times that the dynamic push information is displayed. The click data is a quantity generated due to clicking in event that the dynamic push information is exposed. When the client exposes the dynamic push information, the user may click the dynamic push information according to own interests to jump to a corresponding push page such as an application download page or a recharging page, and if the user is not interested, the user may alternatively close the dynamic push information and no click data is generated. The click data can reflect a degree of interest of the user for the dynamic push information.

Step 102: Generating a first probability distribution (for example, a first target beta distribution) corresponding to a click-through rate of each piece of dynamic push information based on exposure data and click data.

Artificial Intelligence (AI) is a theory, method, technology, and application system that uses a digital computer or a machine controlled by the digital computer to simulate, extend, and expand human intelligence, perceive an environment, acquire knowledge, and use knowledge to obtain an optimal result. In other words, AI is a comprehensive technology in computer science and attempts to understand the essence of intelligence and produce a new intelligent machine that can react in a manner similar to human intelligence. AI is to study the design principles and implementation methods of various intelligent machines, to enable the machines to have the functions of perception, reasoning, and decision-making.

The AI technology is a comprehensive discipline, and relates to a wide range of fields including both hardware-level technologies and software-level technologies. The basic AI technologies generally include technologies such as a sensor, a dedicated AI chip, cloud computing, distributed storage, a big data processing technology, an operating/interaction system, and electromechanical integration. AI software technologies mainly include several major directions such as a computer vision (CV) technology, a speech processing technology, a natural language processing technology, and machine learning/deep learning.

The machine learning (ML) is an interdisciplinarity involving a plurality of disciplines such as the probability theory, statistics, approximation theory, convex analysis, and algorithm complexity theory. The ML specializes in studying how a computer simulates or implements a human learning behavior to obtain new knowledge or skills, and reorganize an existing knowledge structure, so as to keep improving its performance. The ML is the core of AI, is a basic way to make the computer intelligent, and is applied to various fields of AI. The ML and deep learning generally include technologies such as an artificial neural network, a belief network, reinforcement learning, transfer learning, inductive learning, and learning from demonstrations.

The solutions provided in the embodiments of this application involve technologies such as deep learning of AI, and are specifically described by using the following embodiments.

In the related art, when the server pushes the dynamic push information, random selection and a selection strategy based on a historical click-through rate of a creativity may be used.

(a) The random selection is to select any quantity of creativities from all dynamic push information randomly and equiprobably for exposure during each selection. An apparent defect of this method is that an exposure chance may be wasted on a poor creativity, and iteratively evolutionary selection according to feedback data of the creativity cannot be achieved.

(b) The selection strategy based on a historical click-through rate of a creativity is to score and sort a historical click-through rate of each piece of dynamic push information and select any quantity of creativities with the highest click-through rate for recommendation. However, a defect of this strategy lies in that when data of the dynamic push information is relatively low at an early stage, poor dynamic push information may be played intensively due to accident factors of playing, leading to a poor selection result.

Thompson sampling: Performance of each piece of dynamic push information does not have a clear push recommendation strength. The Thompson sampling can resolve a problem of how to obtain a recommendation strength of each piece of dynamic push information. A core of the Thompson sampling is a beta distribution. The beta distribution is a continuous probability distribution defined on an interval [0, 1], and priori distribution information and posteriori distribution information of the beta distribution have a uniform form. It is assumed that the priori distribution information is Beta($\alpha,\beta$), after s times of successes and f times of failures, the posteriori distribution information may be Beta($s+\alpha$, $f+\beta$). In this way, the posteriori distribution information is added to the priori distribution information, so that the entire data is updated along with actual changes.

Further, by adding the posteriori distribution information CTR_post~beta($\hat{\alpha}$+click, $\hat{\beta}$+show−click) to the priori distribution information CTR~beta($\alpha$, $\beta$), a first target beta distribution corresponding to the click-through rate of each piece of dynamic push information is generated, and the first target beta distribution represents a real click-through rate of each piece of dynamic push information in reality.

In some implementations, an operation of generating a first target beta distribution corresponding to the click-through rate of each piece of dynamic push information based on the exposure data and the click data includes:

(1) obtaining priori distribution information corresponding to a click-through rate of historical dynamic push information, and generating a first beta distribution corresponding to the click-through rate of each piece of push information according to the priori distribution information;

(2) counting click data and non-click data generated in a case that each piece of dynamic push information is exposed, to generate posteriori distribution information corresponding to the click-through rate; and (3) adjusting the first beta distribution according to the posteriori distribution information corresponding to the click-through rate, to obtain the first target beta distribution corresponding to the click-through rate of each piece of dynamic push information.

The click-through rates of all historical dynamic push information have approximate range prediction, namely, meet prediction of an approximate range. Therefore, corresponding priori distribution information CTR~beta($\alpha$, $\beta$) may be generated by obtaining the click-through rates of the historical dynamic push information, and the first beta distribution corresponding to the click-through rate of each piece of dynamic push information may be generated according to the priori distribution information.

Further, the click data generated in event that each piece of dynamic push information is exposed and non-click data corresponding to a non-click operation of the user during exposure are counted. The non-click data may be generated by subtracting the click data from the exposure data. Therefore, posteriori distribution information CTR_post~beta($\hat{\alpha}$+click, $\hat{\beta}$+show−click) corresponding to the click-through rate is generated according to the click data and the non-click data, and the first beta distribution is adjusted according to the posteriori distribution information corresponding to the click-through rate, to obtain the first target beta distribution corresponding to the click-through rate of each piece of dynamic push information.

Step 103: Selecting a preset quantity of pieces of dynamic push information according to the first target beta distribution.

In step 103, first predicted click-through rates of to-be-pushed push information are determined according to the first probability distribution, and a preset quantity of pieces of first push information are selected from the to-be-pushed push information according to the first predicted click-through rates. The first target beta distribution continuously combines click habits of the user during an actual use process, so that the first target beta distribution may become more and more close to an actual click use situation with continuous use and learning. A peak value of the first target beta distribution for dynamic push information with excellent click-through rate performance is increasingly high, and a peak value of the first target beta distribution for dynamic push information with poor click-through rate performance is increasingly low, to continuously distinguish different dynamic push information according to actual use, so that the preference of the click-through rate of the dynamic push information can be expressed accurately. Based on this, a preset quantity of pieces of dynamic push information with best click-through rate performance may be selected according to the first target beta distribution corresponding to each piece of dynamic push information, and the preset quantity may be 5 or 10.

In an implementation, the operation of selecting a preset quantity of pieces of dynamic push information according to the first target beta distribution may include:

(1) obtaining a predicted click-through rate of each piece of dynamic push information according to the first target beta distribution; and (2) selecting the preset quantity of pieces of target dynamic push information in descending order of the predicted click-through rates.

A sampling value of the first target beta distribution is the predicted click-through rate of the dynamic push information. Therefore, a sampling value of the first target beta distribution corresponding to each piece of dynamic push information may be obtained separately, to obtain a predicted click-through rate of each piece of dynamic push information. A higher predicted click-through rate indicates that the corresponding dynamic push information is more popular among users, and a lower predicted click-through rate indicates that the corresponding dynamic push information is less popular among users. The selection is performed in descending order of the predicted click-through rates, to select the preset quantity of pieces of best target dynamic push information.

Step 104: Obtaining target predicted click-through rates of the preset quantity of pieces of dynamic push information, and selecting target dynamic push information for pushing according to the target predicted click-through rates.

In step 104, a target predicted click-through rate of each piece of first push information in the first push information is obtained by using a preset target click-through rate prediction model, and target push information is selected for pushing from the first push information according to the target predicted click-through rate. When the preset quantity of pieces of dynamic push information are obtained, in this embodiment of this application, the preset quantity of pieces of dynamic push information may be further ranked by using an advertisement click-through rate prediction (Pctr) model. The Pctr model is a mature advertisement prediction model and can predict an accurate target predicted click-through rate of dynamic push information. Therefore, the target predicted click-through rates of the preset quantity of pieces of dynamic push information may be obtained by using the Pctr model. A higher target predicted click-through rate indicates a greater probability that the dynamic push information is clicked, and a lower target predicted click-through rate indicates a lower probability that the dynamic push information is clicked, thereby implementing accurate secondary prediction.

Further, the preset quantity of pieces of dynamic push information may be ranked according to the target predicted click-through rates, and target dynamic push information ranked first or second is selected for pushing, to implement secondary filtering. Therefore, the target dynamic push information is the best creativity, and the target push information can be first pushed to the user.

In an implementation, the operation of obtaining target predicted click-through rates of the preset quantity of pieces of dynamic push information, and selecting target dynamic push information for pushing according to the target predicted click-through rates may include:

(1) predicting the preset quantity of pieces of dynamic push information by using the target click-through rate prediction model, to obtain target predicted click-through rates of the preset quantity of pieces of dynamic push information;

(2) summing the exposure data of each piece of dynamic push information to obtain target exposure data; and (3) selecting the target dynamic push information for pushing by combining the target predicted click-through rate and the target exposure data.

Ranking prediction is performed on the preset quantity of pieces of dynamic push information by using the target click-through rate prediction (Pctr) model, to obtain the target predicted click-through rates of the preset quantity of pieces of dynamic push information. The exposure data of each piece of dynamic push information is summed, to obtain total target exposure data, and the target exposure data reflects an exposure situation of the dynamic push information.

Further, at an early stage of exposure, namely, the target exposure data is less than a certain quantity, exposure of creativities of each piece of dynamic push information is limited. Therefore, corresponding target dynamic push information may be selected from the preset quantity of pieces of dynamic push information based on a random sampling concept. A higher target predicted click-through rate indicates a higher selected probability, and a lower target predicted click-through rate indicates a lower selected probability, so that the preset quantity of pieces of dynamic push information all have a chance to be pushed at the early stage of exposure. At a later stage of exposure, namely, the target exposure data is greater than the certain quantity, the estimated accuracy of the Pctr model reaches a certain level, so that target dynamic push information with the highest target predicted click-through rate can be directly selected for pushing.

As can be known from the above, in this embodiment of this application, operation information of each piece of dynamic push information is counted; a first target beta distribution corresponding to the click-through rate of each piece of dynamic push information is generated based on the exposure data and the click data; a preset quantity of pieces of dynamic push information are selected according to the first target beta distribution; and target predicted click-through rates of the preset quantity of pieces of dynamic push information are obtained, and target dynamic push information is selected for pushing according to the target predicted click-through rates. Based on this, the operation information of each piece of dynamic push information is counted in real time, the first target beta distribution corresponding to the click-through rate of each piece of dynamic push information is generated based on the Thompson sampling concept, the preset quantity of pieces of dynamic push information are selected according to the first target beta distribution and corresponding target click-through rates are obtained, and accurate target dynamic push information is selected for pushing according to the target click-through rates, thereby greatly improving the accuracy of information processing.

Embodiment 2

According to the method described in Embodiment 1, the following further provides detailed descriptions by using examples.

In this embodiment, a description is made by using an example in which the information processing apparatus is specifically integrated in the server.

Figure 3:
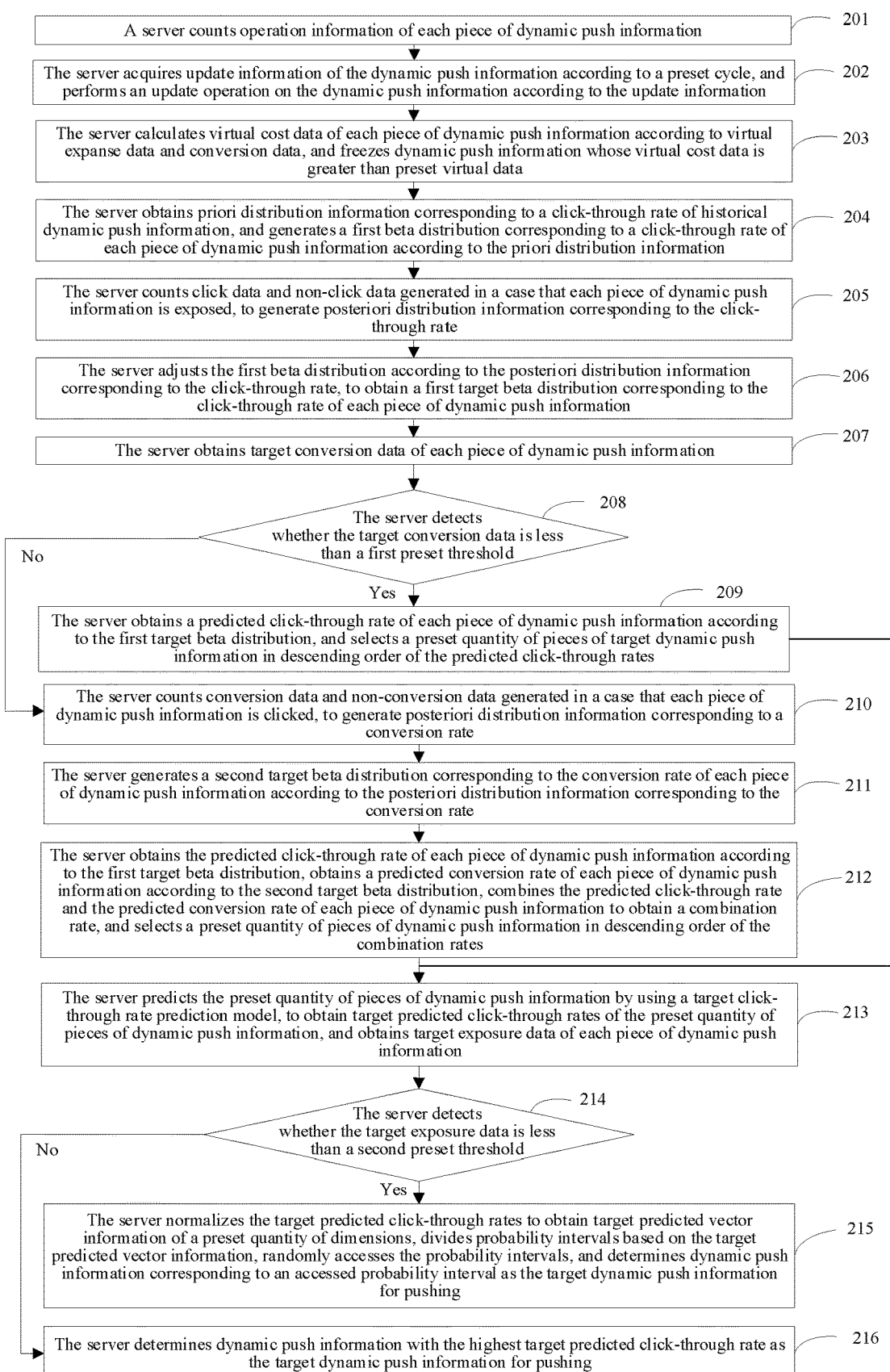
FIG. 3 is another schematic flowchart of an information processing method according to an embodiment of this application.

Referring to FIG. 3, FIG. 3 is another schematic flowchart of an information processing method according to an embodiment of this application. The method process may include:

Step 201: The server counts operation information of each piece of dynamic push information.

Figures 4A, 4B:
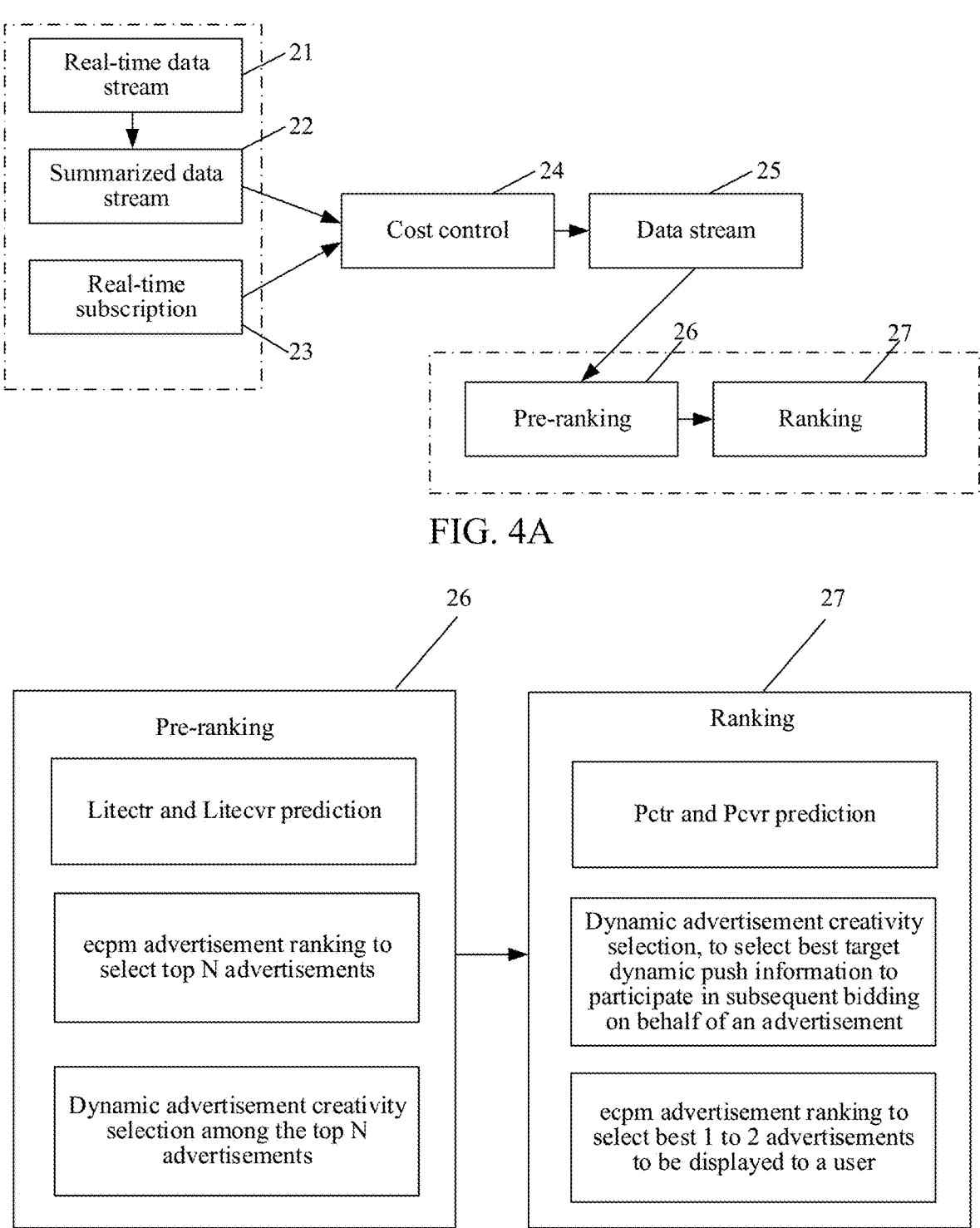
FIG. 4*a* is a schematic framework diagram of an information processing method according to an embodiment of this application.
FIG. 4*b* is another schematic framework diagram of an information processing method according to an embodiment of this application.

Referring to FIG. 4*a* together, FIG. 4*a* is a schematic framework diagram of an information processing method according to an embodiment of this application. Each DC advertisement includes a plurality of pieces of exclusive dynamic push information, the dynamic push information may be understood as an advertisement creativity, and data of different DC advertisements is separated. The server obtains operation information of each piece of dynamic push information in each DC advertisement in real time by using a real-time data stream module 21, and the operation information includes at least exposure data, click data, conversion data, and virtual expanse data.

Further, the operation information of each piece of dynamic push information is counted by summarizing data streams, and a counting time length may be a current day, recent three days, or all summarized data.

Step 202: The server acquires update information of the dynamic push information according to a preset cycle, and performs an update operation on the dynamic push information according to the update information.

Still referring to FIG. 4*a*, the server acquires, by using a real-time subscription module 23, update information of a pushing person for the dynamic push information according to a preset cycle such as every 1 minute, where the update information includes adding, deleting, searching, and modifying information, and the server performs a replace operation on the push information stored in the server in real time according to the update information, thereby ensuring that an operation of the pushing person on the dynamic push information can be fed back to a backend in time.

Step 203: The server calculates virtual cost data of each piece of dynamic push information according to the virtual expanse data and the conversion data, and freezes dynamic push information whose virtual cost data is greater than preset virtual data.

The pushing person sets an expected cost price target cpa for each piece of dynamic push information, and the server is responsible for controlling an actual bid during exposure, to achieve an objective that costs of each conversion behavior is within 1.2 times of an expected cost price of the pushing person. Still referring to FIG. 4*a*, a cost control module 24 is responsible for clamping down dynamic push information with poor cost performance in the virtual cost data of the dynamic push information, to achieve an objective of controlling an expected cost price of the pushing person.

Further, the cost control module 24 may calculate the virtual cost data of each piece of dynamic push information according to a ratio of the virtual expanse data (namely, expanse) to the conversion data after a conversion amount of the dynamic push information exceeds a certain amount. For example, a calculation formula is as follows:

$$cpa = \frac{sum(cost)}{sum(conversion)}$$

The cpa is the virtual cost data, the sum(cost) is the virtual expanse data, and the sum(conversion) is the conversion data. The virtual cost data cpa of each piece of dynamic push information may be calculated according to the ratio of the virtual expanse data to the conversion data, and the preset virtual data may be 1.2 times of an expected cost price. When the virtual cost data is greater than the expected cost price, it indicates that the costs are too high, and an exposure chance of dynamic push information whose costs are too high needs to be reduced. That is, the dynamic push information whose virtual cost data is greater than the preset virtual data may be frozen and does not participate in subsequent exposure. Therefore, benefits of the pushing person are protected, and information filtered by the cost control module 24 may be quickly transmitted to a pre-ranking module 26 through a data stream 25.

Step 204: The server obtains priori distribution information corresponding to a click-through rate of historical dynamic push information, and generates a first beta distribution corresponding to the click-through rate of each piece of dynamic push information according to the priori distribution information.

The click-through rate of the historical dynamic push information has an approximate range, so that before the dynamic push information is pushed, average probability prediction may be performed on the dynamic push information. Therefore, priori distribution information CTR~beta($\alpha$, $\beta$) corresponding to the click-through rate of the historical dynamic push information may be obtained, and the first beta distribution corresponding to the click-through rate of each piece of dynamic push information may be generated according to the priori distribution information, where the first beta distribution is an average click-through rate distribution.

Step 205: The server counts click data and non-click data generated in a case that each piece of dynamic push information is exposed, to generate posteriori distribution information corresponding to the click-through rate.

The server counts the click data generated in a case that each piece of dynamic push information is exposed, obtains non-click data by subtracting the click data from the exposure data, and generates posteriori distribution information CTR_post~beta($\hat{\alpha}$+click, $\hat{\beta}$+show−click) corresponding to the click-through rate according to the click data and the non-click data.

Step 206: The server adjusts the first beta distribution according to the posteriori distribution information corresponding to the click-through rate, to obtain a first target beta distribution corresponding to the click-through rate of each piece of dynamic push information.

The server adjusts a curve of the first beta distribution according to the posteriori distribution information CTR_post~beta($\alpha$+click, $\beta$+show−click) corresponding to the click-through rate, to obtain a first target beta distribution corresponding to the click-through rate of each piece of dynamic push information. The first target beta distribution continuously combines click habits of the user during an actual use process, so that the first target beta distribution may become more and more close to an actual use situation.

Step 207: The server obtains target conversion data of each piece of dynamic push information.

In the related art of pushing the dynamic push information, an effect at a conversion data level is not considered. The conversion data is behavior data of an expected event of the pushing person such as application downloading or virtual recharging after the user clicks the dynamic push information, and the conversion effect is core benefits of the pushing person, so that corresponding improvements need to be made.

In an implementation, the operation of obtaining target conversion data of each piece of dynamic push information may include summing conversion data of each piece of dynamic push information to obtain the target conversion data.

In this embodiment of this application, an accumulation speed of the conversion data is relatively slow, and there may be no conversion data or few conversion data for a long time at the early stage. Therefore, a premise of considering the conversion data in terms of the push level is that the target conversion data reaches a certain quantity, so that the server can sum the conversion data of each piece of dynamic push information, to obtain the total target conversion data.

In another implementation, the operation of obtaining target conversion data of each piece of dynamic push information may further include counting average conversion data of the dynamic push information, and determining the average conversion data as the target conversion data.

In this embodiment of this application, an accumulation speed of the conversion data is relatively slow, and there may be no conversion data or few conversion data for a long time at the early stage. Therefore, a premise of considering the conversion data in terms of the push level is that the average conversion data of each piece of dynamic push information reaches a certain quantity. For example, when the average conversion data of each piece of dynamic push information in the same dynamic advertisement is greater than 1, a condition is met. Based on this, the server can count a sum of the conversion data of all dynamic push information, calculate a ratio of the sum to the quantity of pieces of the dynamic push information (namely, a quantity of creativities) to obtain average conversion data, and determine the average conversion data as the target conversion data.

Step 208: The server detects whether the target conversion data is less than a first preset threshold.

The first preset threshold is a critical value defining whether the target conversion data reaches a certain quantity, and a quantity of the first preset thresholds may be the quantity of pieces of dynamic push information. Step 209 is performed in a case that the server detects that the target conversion data is less than the first preset threshold. Step 210 is performed in a case that the server detects that the target conversion data is not less than the first preset threshold.

Step 209: The server obtains a predicted click-through rate of each piece of dynamic push information according to the first target beta distribution, and selects a preset quantity of pieces of target dynamic push information in descending order of the predicted click-through rates.

In a case that the server detects that the target conversion data is less than the first preset threshold, it indicates that the conversion data does not meet requirements. Therefore, the server may obtain a sampling value of the first target beta distribution corresponding to each piece of dynamic push information separately, to obtain the predicted click-through rate of each piece of dynamic push information, and select the preset quantity of pieces of target dynamic push information in descending order of the predicted click-through rates, to implement a pre-ranking manner of the pre-ranking module 26.

Step 210: The server counts conversion data and non-conversion data generated in event that each piece of dynamic push information is clicked, to generate posteriori distribution information corresponding to a conversion rate.

In event that the server detects that the target conversion data is not less than the first preset threshold, it indicates that the conversion data meets requirements, so that the server can start to pre-estimate a conversion rate of each piece of dynamic push information, and count the conversion data and non-conversion data generated when each piece of dynamic push information is clicked based on the Thompson sampling principle. The conversion data is data of a quantity of times that the user completes an expected operation after clicking the dynamic push information, and the non-conversion data is data of a quantity of times that the user does not complete an expected operation after clicking the dynamic push information. The data has a certain scale, so that posteriori distribution information CVR_postbeta(conversion,click−conversion) corresponding to the conversion rate may be directly generated according to the conversion data and the non-conversion data, and the conversion is the conversion data, and the click the click data.

Step 211: The server generates a second target beta distribution corresponding to the conversion rate of each piece of dynamic push information according to the posteriori distribution information corresponding to the conversion rate.

The second target beta distribution corresponding to the conversion rate of each piece of dynamic push information is generated according to the posteriori distribution information CVR_post∼beta(conversion,click−coversion) corresponding to the conversion rate, and the second target beta distribution can continuously combine conversion habits of the user during an actual use process, so that the second target beta distribution may become more and more close to an actual conversion use situation with continuous use and learning.

Step 212: The server obtains the predicted click-through rate of each piece of dynamic push information according to the first target beta distribution, obtains a predicted conversion rate of each piece of dynamic push information according to the second target beta distribution, combines the predicted click-through rate and the predicted conversion rate of each piece of dynamic push information to obtain a combination rate, and selects a preset quantity of pieces of dynamic push information in descending order of the combination rates.

The server separately obtains the sampling value of the first target beta distribution corresponding to each piece of dynamic push information to obtain the predicted click-through rate of each piece of dynamic push information; separately obtains a sampling value of the second target beta distribution corresponding to each piece of dynamic push information to obtain the predicted conversion rate of each piece of dynamic push information; combines the predicted click-through rate and the predicted conversion rate of each piece of dynamic push information, for example, multiplies and combines the predicted click-through rate and the predicted conversion rate, to obtain a combination rate; and selects the preset quantity of pieces of dynamic push information in descending order of the combination rates, to implement an effect of combining the preset quantity of pieces of dynamic push information with the conversion data. In this way, dynamic push information selection is performed by integrating a click-through rate dimension and a conversion rate dimension, thereby implementing another pre-ranking manner of the pre-ranking module 26.

Step 213: The server predicts the preset quantity of pieces of dynamic push information by using a target click-through rate prediction model, to obtain target predicted click-through rates of the preset quantity of pieces of dynamic push information, and obtains target exposure data of each piece of dynamic push information.

Referring to FIG. 4*a* and FIG. 4*b* together, the pre-ranking module 26 includes a lightweight click-through rate prediction (Litectr) model and a lightweight conversion prediction (Litecvr) model. The Litectr model can obtain the predicted click-through rate of each piece of dynamic push information, and the Litecvr model can obtain the predicted conversion rate of each piece of dynamic push information. Further, an effective cost per mille (ecpm) indicator of an advertisement is obtained, and all advertisements are ranked in descending order according to the ecpm indicators to second top N advertisements. For example, refer to the following formula:

$$ecpm = \text{ocpa\_bid} * Litectr * Litecvr$$

The ocpa_bid is an advertisement bid, the Litectr is the predicted click-through rate, and the Litecvr is the predicted conversion rate, so that a product of the advertisement bid, the predicted click-through rate, and the predicted conversion rate is calculated according to the foregoing formula, and a pre-ranking ecpm indicator of each advertisement can be calculated.

Further, the top N advertisements include DC advertisements, and the DC advertisement includes a plurality of creativities (namely, dynamic push information). Therefore, advertisement creativity selection needs to be performed on each DC advertisement in the top N advertisements, and for a specific advertisement creativity selection manner, reference may be made to the foregoing operation of selecting a preset quantity of pieces of target dynamic push information. After the preset quantity of pieces of target dynamic push information are selected, the target dynamic push information is sent into a ranking module 27. The ranking module 27 includes a target click-through rate prediction (Pctr) model and a target conversion rate prediction (Pcvr) model. The preset quantity of pieces of dynamic push information are predicted by using the target click-through rate prediction model, to obtain the target predicted click-through rates of the preset quantity of pieces of dynamic push information; and the preset quantity of pieces of dynamic push information are predicted by using the target conversion rate prediction model, to obtain the target predicted conversion rates of the preset quantity of pieces of dynamic push information. Because more features of Pctr and Pcvr are inputted into the ranking module 27, so that the prediction precision of the Pctr and Pcvr may be higher.

In an implementation, the operation of obtaining target exposure data of each piece of dynamic push information may include summing exposure data of each piece of dynamic push information to obtain the target exposure data.

In this embodiment of this application, the server may sum the exposure data of each piece of dynamic push information, to obtain the total target exposure data.

In another implementation, the operation of obtaining target exposure data of each piece of dynamic push information may further include counting average exposure data of the dynamic push information, and determining the average exposure data as the target exposure data.

In this embodiment of this application, the server may count a sum of exposure data of all dynamic push information, calculate a ratio of the sum to the quantity of pieces of the dynamic push information (namely, a quantity of creativities) to obtain average exposure data, and determine the average exposure data as the target exposure data.

Step 214: The server detects whether the target exposure data is less than a second preset threshold.

Learning the target click-through rate prediction model needs certain data support, so that at an early stage of exposure, namely, in event that the target exposure data is small, the target click-through rate prediction model may not be accurate, and at a later stage of exposure, namely, event that the target exposure data is sufficient, the target click-through rate prediction model is accurate. Therefore, a second preset threshold needs to be set to distinguish whether it is currently at the early stage or the later stage of exposure, and the second preset threshold may be 5000 or 300. Step 215 is performed in event that the server detects that the target exposure data is less than the second preset threshold, and step 216 is performed in event that the server detects that the target exposure data is not less than the second preset threshold.

Step 215: The server normalizes the target predicted click-through rates to obtain target predicted vector information of a preset quantity of dimensions, divides probability intervals based on the target predicted vector information, randomly accesses the probability intervals, and determines dynamic push information corresponding to an accessed probability interval as the target dynamic push information for pushing.

In event that the server detects that the target exposure data is less than the second preset threshold, it indicates that the ranking module 27 is at the early stage of exposure, exposure of the preset quantity of pieces of dynamic push information is limited, and the Pctr model is inaccurate. In this case, selection cannot be fully performed according to the Pctr model, and the target predicted click-through rates need to be normalized by using a softmax function, to obtain target predicted vector information of a preset quantity of dimensions, where a probability range of a vector element of each dimension is (0, 1), and a sum of vector elements of all dimensions is 1. A greater target predicted click-through rate indicates a greater probability range after conversion, and the softmax function is as follows:

$$\text{Win\_rate}_i = \frac{e^{pctr_i}}{\sum_{i=0}^{num\ of\ creatives} e^{pctr_i}}$$

The Win_rate$_i$ is the target predicted vector information, the e is a constant, the Pctr, is the target predicted click-through rate, and the num of creativities is a value obtained by reducing the preset quantity by 1.

Further, the probability interval (0, 1) is divided according to a probability of each element in the target predicted vector information, where a higher probability indicates a greater distributed probability interval, and a lower probability indicates a smaller distributed probability interval. The divided probability intervals are randomly accessed, a greater probability interval indicates a greater accessed probability, and a smaller probability interval indicates a smaller accessed probability. Dynamic push information corresponding to an accessed probability interval is determined as the target dynamic push information for pushing, namely, the target dynamic push information represents the DC advertisement to participate in subsequent bidding. Therefore, dynamic push information with a low target predicted click-through rate but a high conversion rate may also obtain creativity recommendation, and the benefits of the pushing person are fully considered, making pushing of the target dynamic push information diversified.

Step 216: The server determines dynamic push information with the highest target predicted click-through rate as the target dynamic push information for pushing.

In event that the server detects that the target exposure data is not less than the second preset threshold, it indicates that the ranking module 27 is at the later stage of exposure, exposure of the preset quantity of pieces of dynamic push information reaches requirements, and prediction of the Pctr model is accurate, so that the dynamic push information with the highest target predicted click-through rate may be directly determined as the target push information for pushing. That is, the target dynamic push information represents the DC advertisement to participate in subsequent bidding.

Still referring to FIG. 4b, after the ranking module 27 determines the optimal target dynamic push information of each DC advertisement as representative, more accurate target ecpm indicators of the top N advertisements are further calculated, and the best 1 to 2 advertisements are selected according to the target ecpm indicator to be pushed to the user. For example, refer to the following formula:

$$ecpm = ocpa\_bid * Pctr * Pcvr$$

The ocpa_bid is an advertisement bid, the Pctr is the target predicted click-through rate, and the Litecvr is the target predicted conversion rate, so that a product of the advertisement bid, the target predicted click-through rate, and the target predicted conversion rate is calculated according to the foregoing formula, a ranking ecpm indicator of each advertisement can be calculated, and the best 1 to 2 advertisements are pushed to the user according to the ranking ecpm indicator.

In some implementations, after the ranking module 27 predicts the preset quantity of pieces of dynamic push information by using the target click-through rate prediction model, to obtain target predicted click-through rates of the preset quantity of pieces of dynamic push information, the method may further include:

(1) predicting the preset quantity of pieces of dynamic push information by using a target conversion rate prediction (Pcvr) model, to obtain target predicted conversion rates of the preset quantity of pieces of dynamic push information, multiplying the target predicted click-through rates by the target predicted conversion rates to obtain target combination rates, and summing the exposure data of each piece of dynamic push information to obtain the target exposure data.

(2) The server detects whether the target exposure data is less than the second preset threshold.

Step (3) is performed in event that the server detects that the target exposure data is less than the second preset threshold, and step (4) is performed in event that the server detects that the target exposure data is not less than the second preset threshold.

(3) The server normalizes the target combination rates to obtain combined predicted vector information of a preset quantity of dimensions, divides probability intervals based on the combined predicted vector information, randomly accesses the probability intervals, and determines dynamic push information corresponding to an accessed probability interval as the target dynamic push information for pushing.

(4) The server determines dynamic push information with the highest target combination rate as the target dynamic push information for pushing.

The target predicted conversion rate and the target predicted click-through rate are combined, and selection recommendation of the target dynamic push information at a conversion level is further introduced into the ranking module 27, so that the target dynamic push information is more accurate. For the same description part, reference may be made to the above, and details are not specifically described herein again.

As can be known from the above, in this embodiment of this application, operation information of each piece of dynamic push information is counted; a first target beta distribution corresponding to the click-through rate of each piece of dynamic push information is generated based on the exposure data and the click data; a preset quantity of pieces of dynamic push information are selected according to the first target beta distribution; and target predicted click-through rates of the preset quantity of pieces of dynamic push information are obtained, and target dynamic push information is selected for pushing according to the target predicted click-through rates. Based on this, the operation information of each piece of dynamic push information is counted in real time, the first target beta distribution corresponding to the click-through rate of each piece of dynamic push information is generated based on the Thompson sampling concept, the preset quantity of pieces of dynamic push information are selected according to the first target beta distribution and corresponding target click-through rates are obtained, and accurate target dynamic push information is selected for pushing according to the target click-through rates, thereby greatly improving the accuracy of information processing.

Further, the conversion data level is introduced into a selection process to filter the dynamic push information, so that pushing of the target dynamic push information is more consistent with requirements of the pushing person, thereby improving the effect of creativity selection and further improving the accuracy of information processing.

Embodiment 3

To better implement the information processing method provided in the embodiments of this application, an embodiment of this application further provides an apparatus based on the foregoing information processing method. Nouns have meanings the same as those in the foregoing information processing method. For specific implementation details, refer to the description in the method embodiments.

Figures 5, 6:
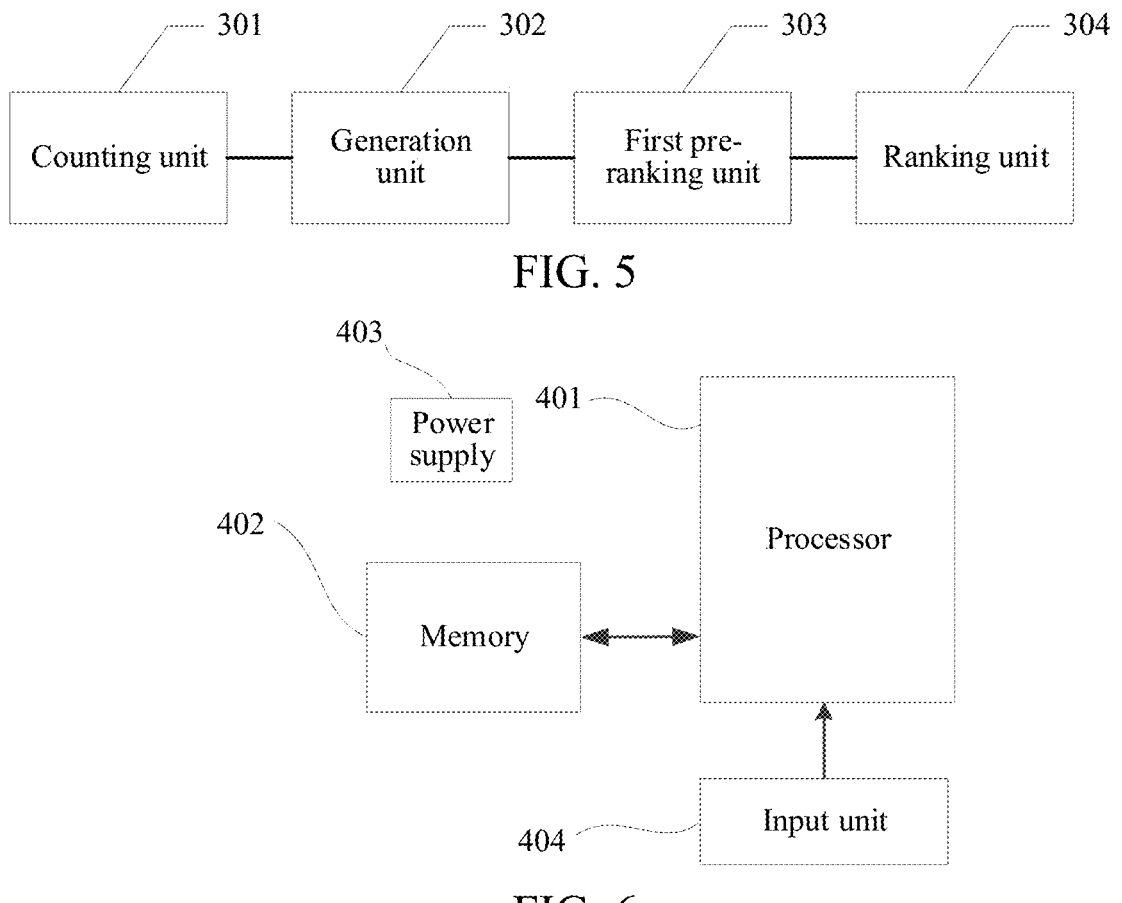
FIG. 5 is a schematic structural diagram of an information processing apparatus according to an embodiment of this application.
FIG. 6 is a schematic structural diagram of a server according to an embodiment of this application.

Referring to FIG. 5, FIG. 5 is a schematic structural diagram of an information processing apparatus according to an embodiment of this application. The information processing apparatus may include: a counting unit 301, a generation unit 302, a first pre-ranking unit 303, and a ranking unit 304.

The counting unit 301 is configured to count feedback data of historical push information, the feedback data including at least exposure data and click data.

The generation unit 302 is configured to generate a first probability distribution corresponding to a click-through rate of each piece of historical dynamic push information based on the exposure data and the click data.

In some implementations, the generation unit 302 is configured to: obtain priori distribution information corresponding to the click-through rate of the historical dynamic push information, and generate a first beta distribution corresponding to the click-through rate of each piece of dynamic push information according to the priori distribution information; count click data and non-click data generated in event that each piece of dynamic push information is exposed, to generate posteriori distribution information corresponding to the click-through rate; and adjust the first beta distribution according to the posteriori distribution information corresponding to the click-through rate, to obtain a first target beta distribution corresponding to the click-through rate of each piece of dynamic push information.

The first pre-ranking unit 303 is configured to determine first predicted click-through rates of to-be-pushed push information according to the first probability distribution, and select a preset quantity of pieces of first push information from the to-be-pushed push information according to the first predicted click-through rates.

In some embodiments, the first pre-ranking unit 303 is configured to: obtain a predicted click-through rate of each piece of dynamic push information according to the first target beta distribution; and select the preset quantity of pieces of target dynamic push information in descending order of the predicted click-through rates.

The ranking unit 304 is configured to obtain a target predicted click-through rate of each piece of first push information by using a preset target click-through rate prediction model, and select target dynamic push information for pushing according to the target predicted click-through rate.

In some embodiments, the ranking unit 304 includes:

a prediction subunit, configured to predict the preset quantity of pieces of dynamic push information by using the target click-through rate prediction model, to obtain target predicted click-through rates of the preset quantity of pieces of dynamic push information;

an exposure subunit, configured to obtain target exposure data of each piece of dynamic push information; and a combination subunit, configured to select the target dynamic push information for pushing by combining the target predicted click-through rate and the target exposure data.

In some embodiments, the combination subunit is configured to: in response to detecting that the target exposure data is less than a second preset threshold, normalize the target predicted click-through rate to obtain target predicted vector information of a preset quantity of dimensions; divide probability intervals based on the target predicted vector information, randomly access the probability intervals, and determine dynamic push information corresponding to an accessed probability interval as the target dynamic push information for pushing; and in response to detecting that the target exposure data is not less than the second preset threshold, determine dynamic push information with a highest target predicted click-through rate as the target dynamic push information for pushing.

In some embodiments, the feedback data further includes conversion data, and the apparatus further includes:

a conversion unit, configured to obtain target conversion data of each piece of dynamic push information;

the first pre-ranking unit being configured to: in response to detecting that the target conversion data is less than a first preset threshold, perform an operation of selecting a preset quantity of pieces of dynamic push information according to the first target beta distribution;

a second pre-ranking unit, configured to: in response to detecting that the target conversion data is not less than the first preset threshold, count conversion data and non-conversion data generated in a case that each piece of dynamic push information is clicked, to generate posteriori distribution information corresponding to a conversion rate; generate a second target beta distribution corresponding to the conversion rate of each piece of dynamic push information according to the posteriori distribution information corresponding to the conversion rate; and select a preset quantity of pieces of dynamic push information by combining the first target beta distribution and the second target beta distribution.

In some embodiments, the second pre-ranking unit is further configured to: in response to detecting that the target conversion data is not less than the first preset threshold, count conversion data and non-conversion data generated when each piece of dynamic push information is clicked, to generate posteriori distribution information corresponding to a conversion rate; generate a second target beta distribution corresponding to the conversion rate of each piece of dynamic push information according to the posteriori distribution information corresponding to the conversion rate; obtain a predicted click-through rate of each piece of dynamic push information according to the first target beta distribution; obtain a predicted conversion rate of each piece of dynamic push information according to the second target beta distribution; combine the predicted click-through rate and the predicted conversion rate of each piece of dynamic push information to obtain a combination rate; and select a preset quantity of pieces of dynamic push information in descending order of combination rates.

In some embodiments, the feedback data further includes virtual expanse data, and the apparatus further includes:

a cost control unit, configured to calculate virtual cost data of each piece of dynamic push information according to the virtual expanse data and the conversion data; and freeze dynamic push information whose virtual cost data is greater than preset virtual data.

In some embodiments, the apparatus further includes:

an update unit, configured to acquire update information of the push information according to a preset cycle; and perform an update operation on the dynamic push information according to the update information.

For specific implementation of the foregoing units, refer to the foregoing embodiments, which are not described herein again.

As can be known from the above, in this embodiment of this application, the counting unit 301 counts operation information of each piece of dynamic push information; the generation unit 302 generates a first target beta distribution corresponding to a click-through rate of each piece of dynamic push information based on the exposure data and the click data; the first pre-ranking unit 303 selects a preset quantity of pieces of dynamic push information according to the first target beta distribution; and the ranking unit 304 obtains target predicted click-through rates of the preset quantity of pieces of dynamic push information, and select target dynamic push information for pushing according to the target predicted click-through rates. Based on this, the operation information of each piece of dynamic push information is counted in real time, the first target beta distribution corresponding to the click-through rate of each piece of dynamic push information is generated based on the Thompson sampling concept, the preset quantity of pieces of dynamic push information are selected according to the first target beta distribution and corresponding target click-through rates are obtained, and accurate target dynamic push information is selected for pushing according to the target click-through rates, thereby greatly improving the accuracy of information processing.

Embodiment 4

An embodiment of this application further provides a server. FIG. 6 is a schematic structural diagram of a server used in the embodiments of this application. Specifically:

the server may include components such as a processor 401 including one or more processing cores, a memory 402 including one or more computer-readable storage media, a power supply 403, and an input unit 404. A person skilled in the art may understand that the server structure shown in FIG. 6 does not constitute a limit to the server. The server may include more or fewer components than those shown in the figure, or some components may be combined, or a different component deployment may be used.

The processor 401 is a control center of the server, and is connected to various parts of the entire server by using various interfaces and lines. By running or executing a software program and/or module stored in the memory 402, and invoking data stored in the memory 402, the processor executes various functions of the server and performs data processing, thereby monitoring the entire server. Optionally, the processor 401 may include one or more processing cores. Preferably, the processor 401 may integrate an application processor and a modem. The application processor mainly processes an operating system, a user interface, an application program, and the like. The modem mainly processes wireless communication. It may be understood that the foregoing modem may either not be integrated into the processor 401.

The memory 402 may be configured to store a software program and a module, and the processor 401 executes the software program and the module that are stored in the memory 402, to implement various functional applications and data processing. The memory 402 may mainly include a program storage area and a data storage area. The program storage area may store an operating system, an application program required by at least one function (for example, a sound playback function and an image playback function), or the like. The data storage area may store data created according to use of the server. In addition, the memory 402 may include a high speed random access memory, and may further include a non-volatile memory, such as at least one magnetic disk storage device, a flash memory, or another volatile solid-state storage device. Correspondingly, the memory 402 may further include a memory controller, to provide access of the processor 401 to the memory 402.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

The server further includes the power supply 403 for supplying power to the components. Preferably, the power supply 403 may be logically connected to the processor 401 by using a power management system, thereby implementing functions such as charging, discharging, and power consumption management by using the power management system. The power supply 403 may further include one or more of a direct current or alternating current power supply, a recharging system, a power failure detection circuit, a power supply converter or inverter, a power supply state indicator, and any other component.

The server may further include an input unit 404. The input unit 404 may be configured to receive inputted digit or character information, and generate a keyboard, mouse, joystick, optical or track ball signal input related to the user setting and function control.

Although not shown in the figure, the server may further include a display unit. Details are not described herein again. Specifically, in this embodiment, the processor 401 in the server may load, according to the following instructions, executable files corresponding to processes of one or more application programs into the memory 402. The processor 401 runs the application programs stored in the memory 402, to implement various functions as follows:

counting operation information of each piece of dynamic push information, the operation information including at least exposure data and click data; generating a first target beta distribution corresponding to a click-through rate of each piece of dynamic push information based on the exposure data and the click data; selecting a preset quantity of pieces of dynamic push information according to the first target beta distribution; and obtaining target predicted click-through rates of the preset quantity of pieces of dynamic push information, and selecting target dynamic push information for pushing according to the target predicted click-through rates.

In the foregoing embodiments, the descriptions of the embodiments have respective focuses. For a part that is not described in detail in an embodiment, refer to detailed description of the information processing method in the foregoing. Details are not described herein again.

As can be known from the above, the server in this embodiment of this application can count operation information of each piece of dynamic push information; generate a first target beta distribution corresponding to the click-through rate of each piece of dynamic push information based on the exposure data and the click data; select a preset quantity of pieces of dynamic push information according to the first target beta distribution; and obtain target predicted click-through rates of the preset quantity of pieces of dynamic push information, and select target dynamic push information for pushing according to the target predicted click-through rates. Based on this, the operation information of each piece of dynamic push information is counted in real time, the first target beta distribution corresponding to the click-through rate of each piece of dynamic push information is generated based on the Thompson sampling concept, the preset quantity of pieces of dynamic push information are selected according to the first target beta distribution and corresponding target click-through rates are obtained, and accurate target dynamic push information is selected for pushing according to the target click-through rates, thereby greatly improving the accuracy of information processing.

Embodiment 5

A person of ordinary skill in the art may understand that, all or some steps of the methods in the foregoing embodiments may be implemented by using instructions, or implemented through instructions controlling relevant hardware, and the instructions may be stored in a computer-readable storage medium and loaded and executed by a processor.

Accordingly, an embodiment of this application provides a non-transitory computer-readable storage medium, storing a plurality of instructions, the instructions being loaded by a processor, to perform the steps in any information processing method according to the embodiments of this application. For example, the instructions may perform the following steps:

counting operation information of each piece of dynamic push information, the operation information including at least exposure data and click data; generating a first target beta distribution corresponding to a click-through rate of each piece of dynamic push information based on the exposure data and the click data; selecting a preset quantity of pieces of dynamic push information according to the first target beta distribution; and obtaining target predicted click-through rates of the preset quantity of pieces of dynamic push information, and selecting target dynamic push information for pushing according to the target predicted click-through rates.

The computer-readable storage medium may include: a read-only memory (ROM), a random access memory (RAM), a magnetic disk, an optical disc or the like.

Because the instructions stored in the computer-readable storage medium may perform the steps of any information processing method in the embodiments of this application, the instructions can implement beneficial effects that may be implemented by any information processing method in the embodiments of this application. For details, refer to the foregoing embodiments. Details are not described herein again.

The information processing method and apparatus, and the non-transitory computer-readable storage medium provided in the embodiments of this application are described in detail above. The principles and implementations of this application are described through specific examples in this specification, and the descriptions of the embodiments are only intended to help understand the methods and core ideas of this application. Meanwhile, a person skilled in the art may make modifications to the specific implementations and application scopes according to the ideas of this application. In conclusion, the content of this specification is not to be construed as a limitation to this application.

What is claimed is:

1. An information processing method, applied to a server, comprising:

counting feedback data of historical push information, the feedback data comprising at least exposure data and click data;

generating a first probability distribution of a click-through rate of each piece of push information in the historical push information based on the exposure data and the click data;

determining first predicted click-through rates of to-be-pushed push information according to the first probability distribution, and selecting a preset quantity of pieces of first push information from the to-be-pushed push information according to the first predicted click-through rates;

using a preset target click-through rate prediction model to obtain a target predicted click-through rate of each of the pieces of first push information; and selecting target push information for pushing from the pieces of first push information according to the target predicted click-through rate, wherein selecting target push information comprises:

obtaining a target exposure data by summing the exposure data of each of the pieces of first push information;

determining whether the target exposure data is lower than a preset level;

in response to the target exposure data being lower than the preset level, selecting the target push information for pushing by a random selection process based on the target predicted click-through rate; and in response to the target exposure data not being lower than the preset level, selecting the target push information for pushing based on a highest target predicted click-through rate.

2. The information processing method according to claim 1, wherein generating the first probability distribution comprises:

obtaining priori distribution information corresponding to a click-through rate of the historical push information, and generating a first probability distribution corresponding to the click-through rate of each piece of push information according to the priori distribution information;

counting click data and non-click data generated in response to each piece of push information being exposed, to generate posteriori distribution information corresponding to the click-through rate; and adjusting the first probability distribution according to the posteriori distribution information corresponding to the click-through rate, to obtain the first probability distribution corresponding to the click-through rate of each piece of push information.

3. The information processing method according to claim 1, wherein selecting the preset quantity of pieces of first push information according to the first predicted click-through rates comprises:

selecting the preset quantity of pieces of first push information in descending order of the first predicted click-through rates.

4. The information processing method according to claim 1, wherein the feedback data further comprises conversion data, and the method further comprises:

before selecting the preset quantity of pieces of first push information according to the first predicted click-through rates, obtaining target conversion data of each piece of push information;

in response to detecting that the target conversion data is less than a first preset threshold, selecting the preset quantity of pieces of first push information according to the first predicted click-through rates;

in response to detecting that the target conversion data is not less than the first preset threshold, counting conversion data and non-conversion data generated in response to each piece of push information being clicked, to generate posteriori distribution information corresponding to a conversion rate;

generating a second probability distribution corresponding to a conversion rate of each piece of push information according to the posteriori distribution information corresponding to the conversion rate; and selecting the preset quantity of pieces of first push information by combining the first probability distribution and the second probability distribution.

5. The information processing method according to claim 4, wherein selecting the preset quantity of pieces of first push information by combining the first probability distribution and the second probability distribution comprises:

obtaining a predicted click-through rate of each piece of push information according to the first probability distribution;

obtaining a predicted conversion rate of each piece of push information according to the second probability distribution;

combining the predicted click-through rate and the predicted conversion rate of each piece of push information to obtain a combination rate; and selecting the preset quantity of pieces of first push information in descending order of combination rates.

6. The information processing method according to claim 4, wherein the feedback data further comprises virtual expanse data, and the method further comprises:

calculating virtual cost data of each piece of push information according to the virtual expanse data and the conversion data; and freezing push information whose virtual cost data is greater than preset virtual data.

7. The information processing method according to claim 1, wherein selecting the target push information comprises:

in response to detecting that the target exposure data is less than a second preset threshold, normalizing the target predicted click-through rate to obtain target predicted vector information of a preset quantity of dimensions;

dividing probability intervals based on the target predicted vector information, randomly accessing the probability intervals, and determining push information corresponding to an accessed probability interval as the target push information for pushing; and in response to detecting that the target exposure data is not less than the second preset threshold, determining push information with the highest target predicted click-through rate as the target push information for pushing.

8. The information processing method according to claim 1, further comprising:

acquiring update information of the push information according to a preset cycle; and performing an update operation on the push information according to the update information.

9. An information processing apparatus, comprising:

a memory storing a plurality of instructions; and a processor configured to execute the plurality of instructions, wherein upon execution of the plurality of instructions, the processor is configured to:

count feedback data of historical push information, the feedback data comprising at least exposure data and click data;

generate a first probability distribution corresponding to a click-through rate of each piece of push information in the historical push information based on the exposure data and the click data;

determine first predicted click-through rates of to-be-pushed push information according to the first probability distribution, select a preset quantity of pieces of first push information from the to-be-pushed push information according to the first predicted click-through rates;

use a preset target click-through rate prediction model to obtain a target predicted click-through rate of each of the pieces of first push information; and select target push information for pushing from the pieces of first push information according to the target predicted click-through rate, wherein the processor is further configured to:

obtain a target exposure data by summing the exposure data of each of the pieces of first push information;

determine whether the target exposure data is lower than a preset level;

in response to the target exposure data being lower than the preset level, select the target push information for pushing by a random selection process based on the target predicted click-through rate; and in response to the target exposure data not being lower than the preset level, selecting the target push information for pushing based on a highest target predicted click-through rate.

10. The information processing apparatus according to claim 9, wherein the processor, in order to generate the first probability distribution, is configured to execute the plurality of instructions to:

obtain priori distribution information corresponding to a click-through rate of the historical push information, and generate a first probability distribution corresponding to the click-through rate of each piece of push information according to the priori distribution information;

count click data and non-click data generated in response to each piece of push information being exposed, to generate posteriori distribution information corresponding to the click-through rate; and adjust the first probability distribution according to the posteriori distribution information corresponding to the click-through rate, to obtain the first probability distribution corresponding to the click-through rate of each piece of push information.

11. The information processing apparatus according to claim 9, wherein the processor, in order to select the preset quantity of pieces of first push according to the first predicted click-through rates, is configured to execute the plurality of instructions to:

select the preset quantity of pieces of first push information in descending order of the first predicted click-through rates.

12. The information processing apparatus according to claim 9, wherein the feedback data further comprises conversion data, and wherein the processor, upon execution of the plurality of instructions, is further configured to:

obtain target conversion data of each piece of push information;

in response to detecting that the target conversion data is less than a first preset threshold, select the preset quantity of pieces of first push information according to the first predicted click-through rates; and in response to detecting that the target conversion data is not less than the first preset threshold, count conversion data and non-conversion data generated in response to each piece of push information being clicked, to generate posteriori distribution information corresponding to a conversion rate;

generate a second probability distribution corresponding to a conversion rate of each piece of push information according to the posteriori distribution information corresponding to the conversion rate; and select the preset quantity of pieces of first push information by combining the first probability distribution and the second probability distribution.

13. The information processing apparatus according to claim 12, wherein the processor, in order to select the preset quantity of pieces of first push information by combining the first probability distribution and the second probability distribution, is configured to:

obtain a predicted click-through rate of each piece of push information according to the first probability distribution;

obtain a predicted conversion rate of each piece of push information according to the second probability distribution;

combine the predicted click-through rate and the predicted conversion rate of each piece of push information to obtain a combination rate; and select the preset quantity of pieces of first push information in descending order of combination rates.

14. The information processing apparatus according to claim 12, wherein the feedback data further comprises virtual expanse data, and wherein the processor, upon execution of the plurality of instructions, is further configured to:

calculate virtual cost data of each piece of push information according to the virtual expanse data and the conversion data; and freeze at least one piece of the push information whose virtual cost data is greater than preset virtual data.

15. The information processing apparatus according to claim 9, wherein the processor, in order to select the target push information for pushing, is configured to execute the plurality of instructions to:

in response to detecting that the target exposure data is less than a second preset threshold, normalize the target predicted click-through rate to obtain target predicted vector information of a preset quantity of dimensions;

divide probability intervals based on the target predicted vector information, randomly access the probability intervals, and determine push information corresponding to an accessed probability interval as the target push information for pushing; and in response to detecting that the target exposure data is not less than the second preset threshold, determine push information with the highest target predicted click-through rate as the target push information for pushing.

16. The information processing apparatus according to claim 9, wherein the processor, upon execution of the plurality of instructions, is further configured to:

acquire update information of the push information according to a preset cycle; and perform an update operation on the push information according to the update information.

17. A non-transitory computer-readable storage medium storing a plurality of instructions, the instructions configured to be executed by a processor, and upon execution by the processor, cause the processor to:

count feedback data of historical push information, the feedback data comprising at least exposure data and click data;

generate a first probability distribution corresponding to a click-through rate of each piece of push information in the historical push information based on the exposure data and the click data;

determine first predicted click-through rates of to-be-pushed push information according to the first probability distribution, select a preset quantity of pieces of first push information from the to-be-pushed push information according to the first predicted click-through rates;

use a preset target click-through rate prediction model to obtain a target predicted click-through rate of each of the pieces of first push information; and select target push information for pushing from the pieces of first push information according to the target predicted click-through rate, wherein the instructions further cause the processor to:

obtain a target exposure data by summing the exposure data of each of the pieces of first push information;

determine whether the target exposure data is lower than a preset level;

in response to the target exposure data being lower than the preset level, select the target push information for pushing by a random selection process based on the target predicted click-through rate; and in response to the target exposure data not being lower than the preset level, selecting the target push information for pushing based on a highest target predicted click-through rate.

18. The non-transitory computer-readable storage medium of claim 17, wherein the instructions, in order to cause the processor to generate the first probability distribution, is configured to cause the processor to:

obtain priori distribution information corresponding to a click-through rate of the historical push information, and generate a first probability distribution corresponding to the click-through rate of each piece of push information according to the priori distribution information;

count click data and non-click data generated in response to each piece of push information being exposed, to generate posteriori distribution information corresponding to the click-through rate; and adjust the first probability distribution according to the posteriori distribution information corresponding to the click-through rate, to obtain the first probability distribution corresponding to the click-through rate of each piece of push information.

* * * * *